United States Patent [19]
Johannsson

[11] Patent Number: 5,310,073
[45] Date of Patent: May 10, 1994

[54] FREEZING CONTAINER
[75] Inventor: Sigurdur Johannsson, Farwal, Canada
[73] Assignee: Dynoplast Ltd., Saint John, Canada
[21] Appl. No.: 139,034
[22] Filed: Oct. 21, 1993
[51] Int. Cl.⁵ .................................................. B65D 6/24
[52] U.S. Cl. ........................... 220/254; 220/441; 220/444
[58] Field of Search ............ 220/444, 440, 442, 903, 220/908, 254

[56] References Cited
U.S. PATENT DOCUMENTS

| | | |
|---|---|---|
| 686,067 | 11/1901 | Heritage . |
| 3,194,622 | 7/1965 | Harter .................. 220/444 |
| 3,427,822 | 2/1969 | Conly . |
| 3,805,543 | 4/1974 | Eriksen . |
| 4,341,091 | 7/1982 | Minter . |
| 4,541,545 | 9/1985 | Beattie et al. ............. 220/444 |
| 4,584,841 | 4/1986 | Guillaume . |
| 4,917,256 | 4/1990 | Kruck et al. ............. 220/444 |
| 5,103,651 | 4/1992 | Coelho et al. ............ 220/444 |
| 5,105,627 | 4/1992 | Kurita . |

Primary Examiner—Joseph Man-Fu Moy
Attorney, Agent, or Firm—Ridout & Maybee

[57] ABSTRACT

A freezing container has three plastic molded parts: a box, a cover and a hatch lid. All three parts are preferably rotationally molded, double wall insulated components. The box is preferably about 40 cubic feet (1.13 m³) in volume and has an internal fluted surface to promote circulation of refrigerated air. The cover is completely removable from the box and has a front hatch providing access to the box and a rear opening for attachment of a refrigerating unit. The cover is releasably attached to the box, preferably by means of elastomeric straps which extend from the cover rim to engagement pins on the outside of the box. Forklift loops are provided atop the cover and beneath the box to facilitate manipulation of the container.

12 Claims, 4 Drawing Sheets

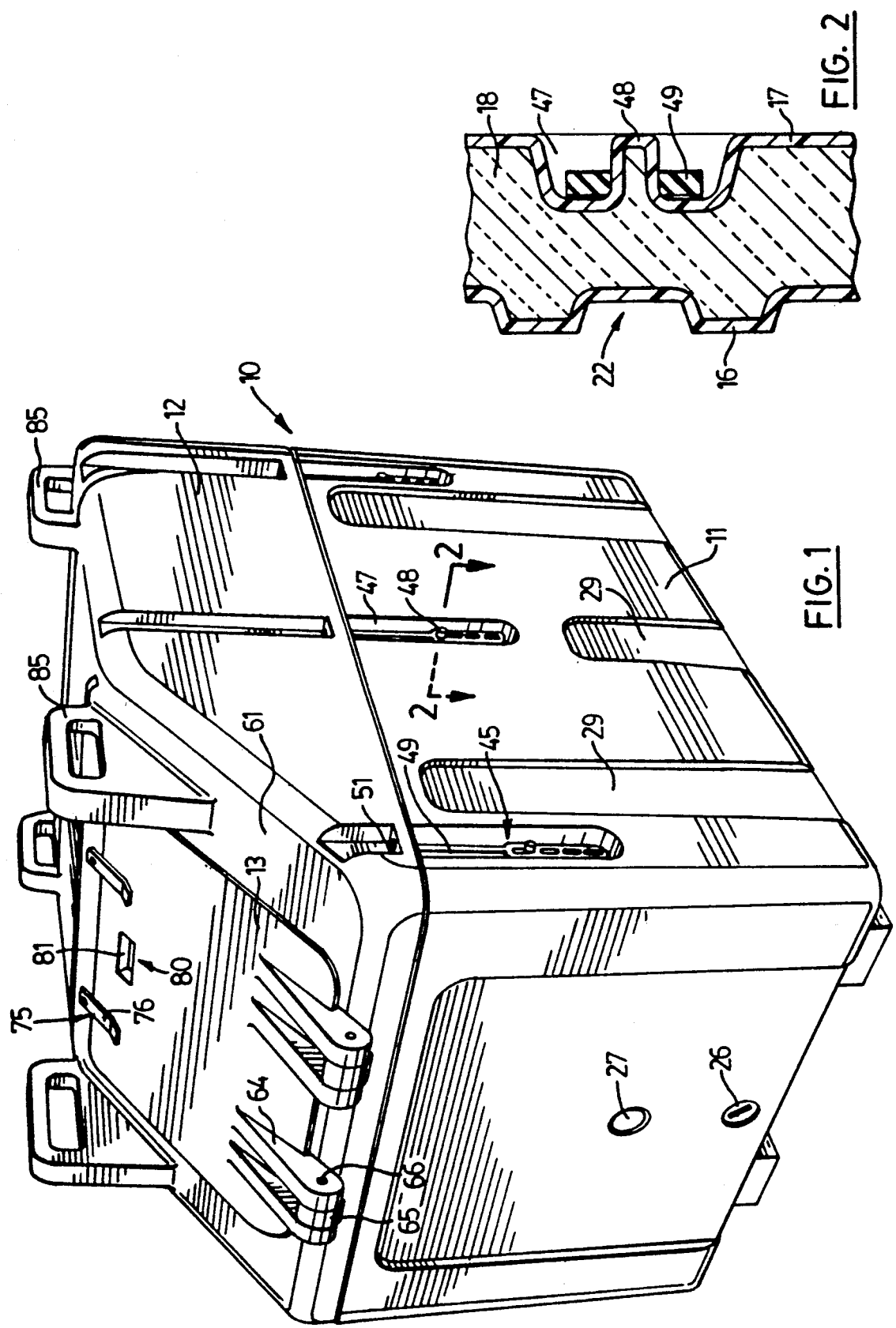

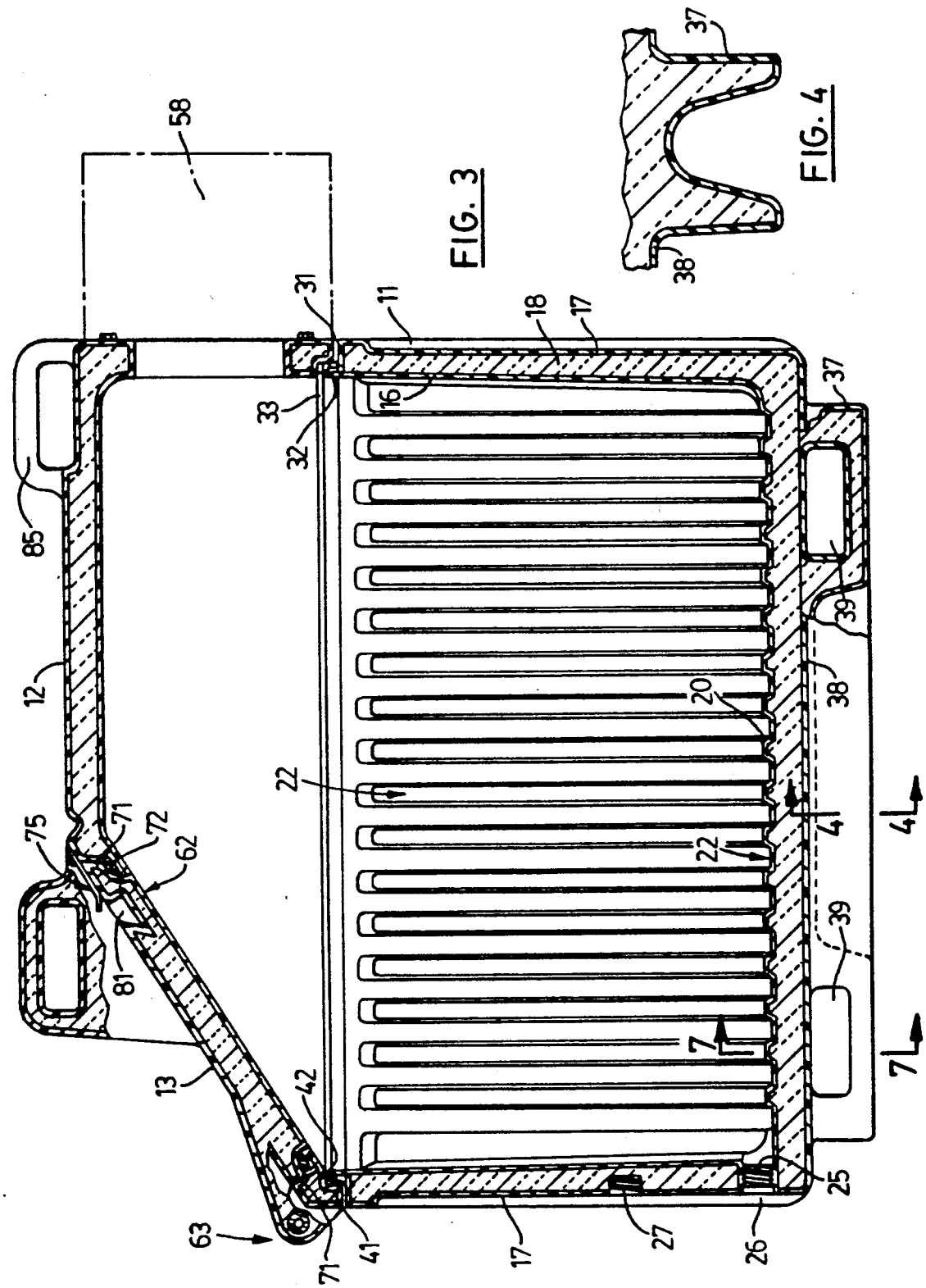

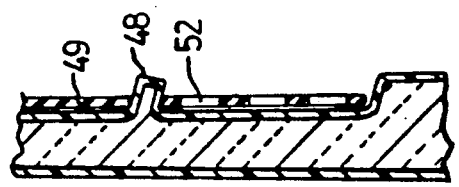
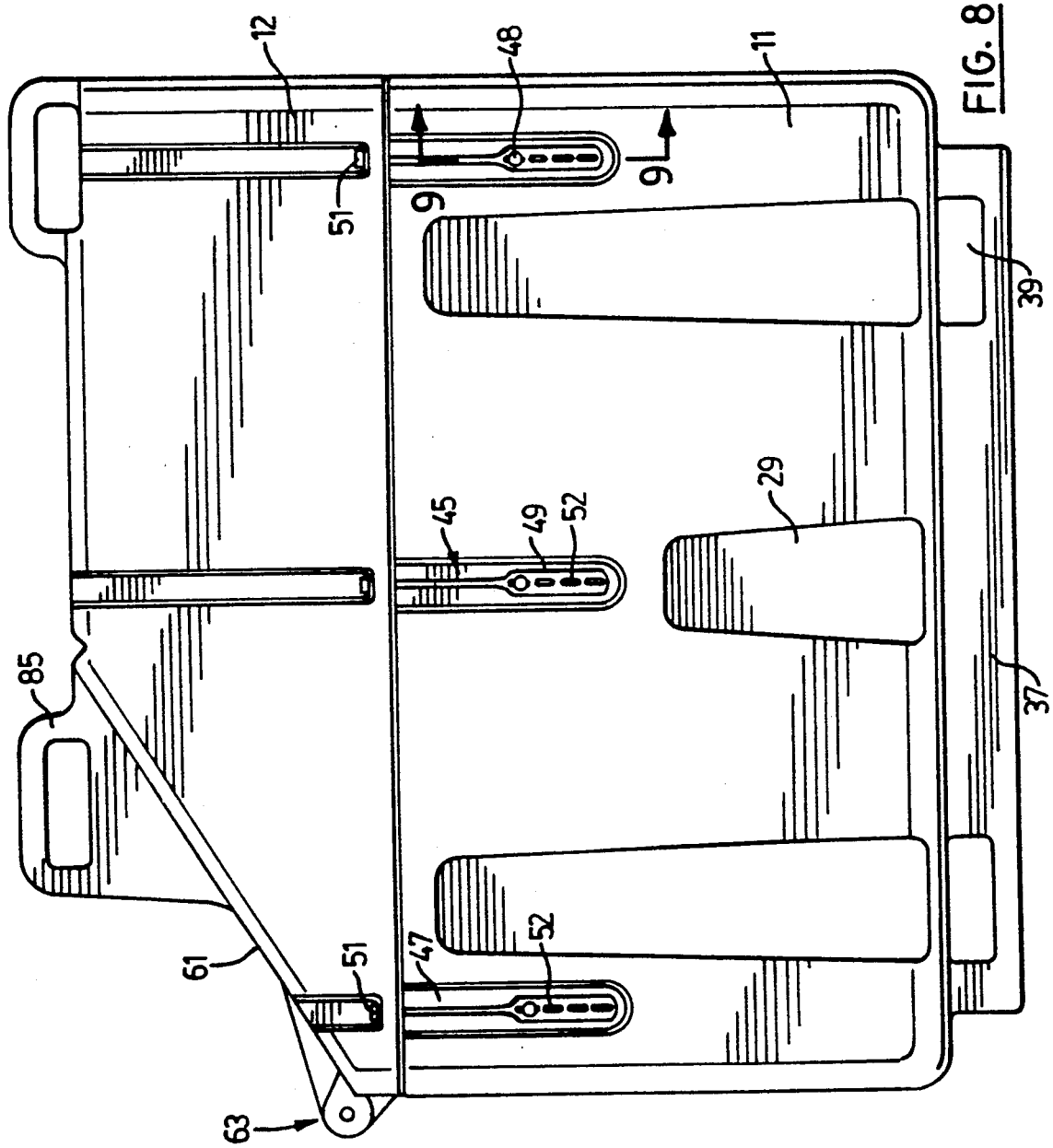

FREEZING CONTAINER

The invention is a freezing container. The invention is primarily intended for the temporary storage of perishables, particularly animal carcasses, destined for processing.

There is currently a serious waste problem in the food production and processing industries of North America and other industrialized regions. The disposal of waste animal products from farms, feed lots, and processing plants is coming under increasingly stricter environmental regulation. In many areas it is now prohibited to bury waste animal products. North American poultry farms alone account for millions of pounds per month of poultry carcasses resulting from disease, injury and other causes of death in pre-market weight animals. These farms are scattered over the continent with each farm generating an insignificant portion of the total quantity of carcasses.

Technology is available for recycling waste animal products into marketable goods such as pet food and fertilizer. Unfortunately, a tremendous amount of such waste cannot presently be recycled because it is allowed to reach a stage of decomposition which renders it useless for recycling. The invention addresses this problem by providing a means for temporarily freezing and storing perishable organic material, such as animal carcasses, until sufficient material is accumulated to transport to a recycling o other processing site.

Accordingly, the invention is a freezing container having a box and cover which is completely detachable from the box. The box has a capacity of at least 25 cubic feet (0.71 m³), and the box and cover are of double wall foam insulated construction. The inner sides and bottom of the box are fluted to promote air circulation around the contents of the container. The cover has an upright rear side provided with an opening for a refrigeration unit and a rearwardly slanting front side defining a hatch which provides access to the interior of the container. A lid is hinged to the cover about the hatch and is also of double wall insulated construction. Sealing means are provided about the hatch/lid and cover/ box interfaces. Releasable attachment means coact with the cover and box to hold the two pieces together. Preferably, the box, cover and lid are made of rotationally molded polyethylene with polyurethane foam insulation bonded between the polyethylene double wall.

These and other features of the invention will be described with reference to the drawings of a preferred embodiment.

BRIEF DESCRIPTION OF THE DRAWINGS

FIG. 1 is a perspective view of a container of the invention.

FIG. 2 is a cross sectional detail of a side of the box at 2—2 in FIG. 1, showing the preferred double wall construction and attachment means.

FIG. 3 is a cross sectional view of the container.

FIG. 4 is a sectional detail taken at 4—4 in FIG. 3, showing structure of a bottom rail of the box.

FIG. 8 is a side elevational view of the container.

FIG. 9 is a sectional detail at 9—9 in FIG. 8 showing a preferred attachment means.

Figure 6:
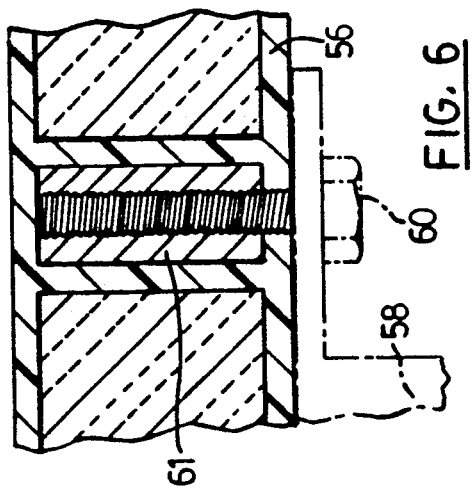
FIG. 6 is a sectional detail taken at 6—6 in FIG. showing attachment means for the refrigeration unit.

A preferred embodiment of the invention is shown in FIG. 1. A container 10 comprises three main parts: a box 11, a cover 12 and a hatch lid 13 associated with cover 12. All three components are of double wall insulated construction having appropriate thermal insulating properties for the intended use. Preferably, the box 11, cover 12 and lid 13 are rotationally molded polyethylene parts with polyurethane foam as the insulation. Typically, the polyethylene inner and outer walls 16 and 17 are about 3/16 inch (4.8 mm) thick at most points with the polyurethane foam insulation 18 being about 2 ½ inches (64 mm) thick on average. As the skilled person will appreciate, the rotational molding process provides high strength and low weight with the polyurethane insulation 18 being bonded to the walls 16 and 17, thereby providing a hollow structural section which is continuously joined together.

The box 11 should be at least 25 cubic feet (0.71 m³) in volume and preferably about 40 cubic feet (1.13 m³). The inner wall 16 of the box 11, including the inner floor wall 20, is shaped with a plurality of flutes 22 which serve to promote refrigerated air circulation along the inner walls 16 and 20. The molding process for making the container components lends itself to the formation of smoothly curved corners which facilitate cleaning of the interior surfaces. Preferably, the box 11 has a drain hole 25 which may be conveniently located at floor level through the front wall of the box 11. The drain hole 25 is preferably threaded so that a screw plug 26 can be used to stopper the hole 25. Conveniently, a threaded storage place 27 is provided in the front wall 17 of the box 11 to store the plug 26 when the drain 25 is open.

The exterior wall 17 of the box 11 is preferably provided with fluting 29 to impart improved structural rigidity to the box 11. The top rim 31 of the box 11 is provided with an upstanding lip 32 having a rubber gasket 33 or the like atop it.

Figure 7:
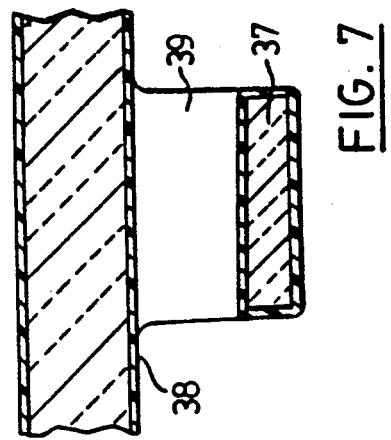
FIG. 7 is a sectional detail taken at 7—7 in FIG. 3 showing further structure of a bottom rail of the box in which openings are provided for forklift prongs.

The box 11 has a pair of parallel ground engaging rails 37 molded into the bottom exterior wall 38. Preferably, the rails 37 are U-shaped in cross section (FIG. 4) centrally thereof, thereby imparting greater structural strength to the rails 37. A pair of slots 39 are defined transversely through each rail 37 with one slot being located near each end of each rail 37 (FIGS. 3 and 7). The slots 39 are sized and positioned to enable the insertion of forklift prongs therethrough, thus facilitating the moving and dumping of the container 11.

The cover 12 is completely detachable from the box 11. The cover 12 has a lower rim 41 and an upwardly stepped peripheral surface 42 which coact with the rim 31 and lip 32 with gasket 33 of the box 11 to provide a sealing engagement of the two components. The cover 12 is releasably attached to the box 11 preferably using a plurality of elastomeric securement means 45 which extend through the rim 41 of the cover 12 into elongate recesses 47 defined in the walls 17 and rim 31 of the box 11. Hold down means, such as pins 48, are provided in the recesses 47 for releasably securing the elastomeric members 45 in tension, thereby attaching the cover 12 to the box 11. As shown in FIGS. 1, 2, 8 and 9, the preferred securement means 45 comprise a rubber strap 49 which passes through an aperture in the cover rim 41 and which is restrained by a head 51. The strap 49 extends downwardly into the recess 47, and has loops 52 for engagement of the strap 49 with the pin 48 in the recess 47. In the preferred embodiment, six securement means 45 are provided, three on opposing sides of the container 10, to sealingly attach the cover 12 to the box 11.

Figure 5:
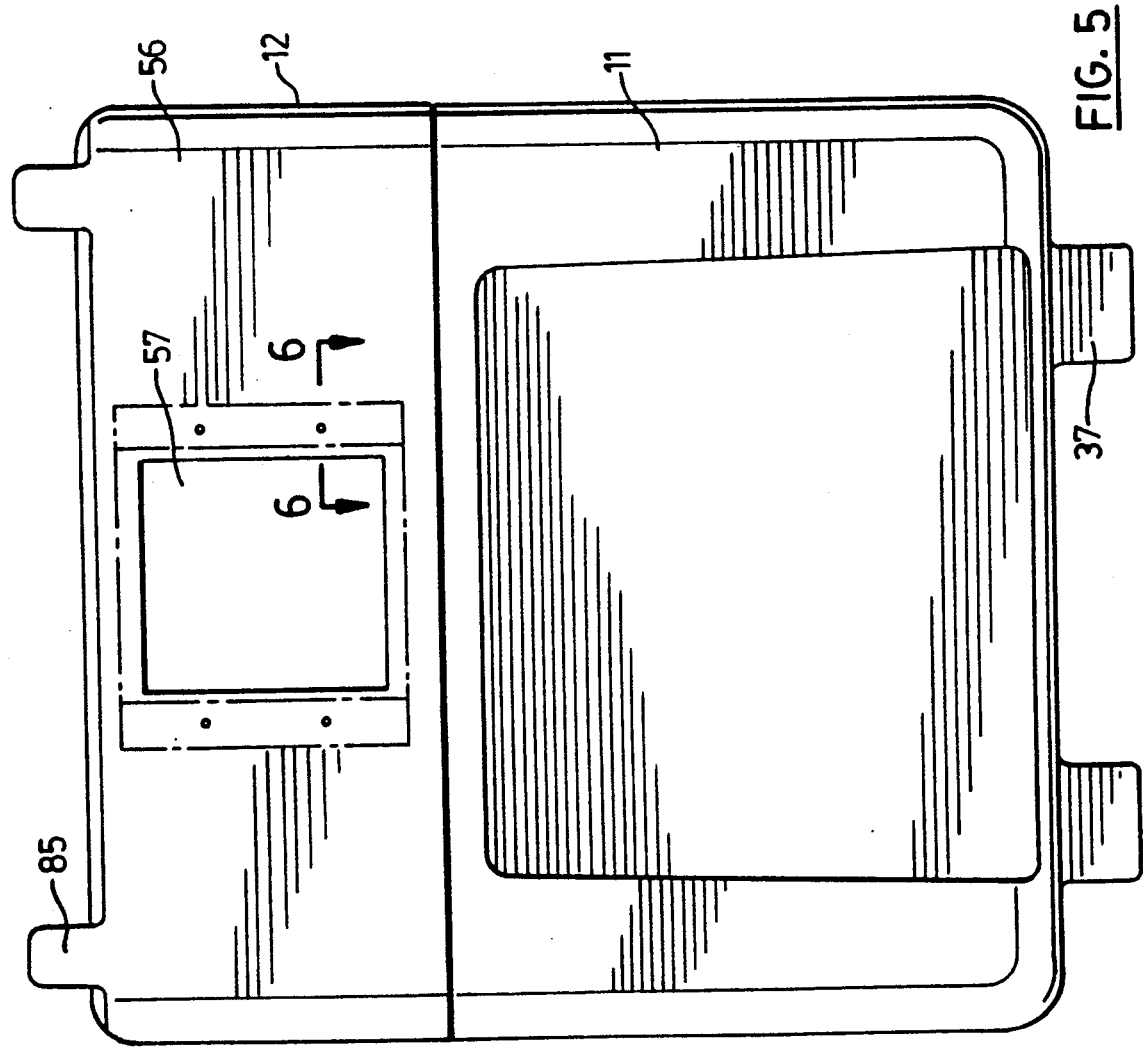
FIG. 5 is a rear elevational view of the container.

The cover 12 has an upright rear wall 56 (FIG. 5) having an opening 57 for a refrigeration unit 58. The refrigeration unit 58 may be attached to the cover 12 by bolts 60 securable in captive nuts 61 provided in the rear wall 56 (FIG. 6). The weight of the refrigeration unit 58 will assist the sealing engagement of the cover 12 about the rear portion of the rim 31 of the box 11.

The cover has a rearwardly slanted front wall 61 having a large opening therethrough defining a hatch 62 providing access to the interior of the container 10. A lid 13 is hinged to the cover 12 about the hatch 62. Preferably, the hinge 63 is provided at the bottom edge of the lid 13 and preferably comprises integrally molded hinge pieces 64 and 65 on the lid 13 and cover 12 which are held by a pin 66 which is preferably of a compatible plastic such as PVC. The periphery of the lid 13 is provided with a drained lip-type mating surface 71 which coacts with a rubber gasket 72 about the periphery of the hatch 62 to provide a sealed closure for the hatch 62. The weight of the lid 13 on the slant of the hatch periphery provides sufficient sealing force for the hatch 62, but preferably, positive closure means 75, such as pivotable arms 76 at the top of the hatch 62, ensure the closure of the lid 13 about the hatch 62. The lid 13 has handle means 80, such as integrally formed slot 81, for opening and closing the lid 13. By hinging the lid 13 about the bottom edge of the hatch 63, the lid 13 may be swung down against the front wall of the box 11 out of he way of the user.

The cover 12 also has integrally formed handle means, which preferably are forklift loops 85 in the top thereof to facilitate removal and replacement of the cover 12 on the box 11. Using the forklift loops 85 on the cover 12 and 39 in the rails 37 of the box 11, the frozen contents of the container can be loaded into suitable transport by first removing the cover 12 and then lifting and inverting the box 11. If needed, the box 11 can then be hosed out and reassembled for further use.

While a preferred embodiment of the invention has been described, the skilled person will appreciate that variants and equivalents of features described are within the scope of the invention defined particularly in the following claims.

I claim:

1. A freezing container, comprising:
    a plastic molded container box having a capacity of at least 25 cubic feet (0.71 m³), said box having four sides and a bottom all being of double wall construction with an inner and outer wall defining a space which is filled with a foam insulting material, the insulating material also providing structural support for the walls of the box, the inner and outer walls being joined about a top peripheral rim of the box, the inner wall being corrugated to define a plurality of flutes in the inner sides and bottom of the box;
    a cover for the box, the cover being completely detachable from the box, the cover having four sides and a top all being of double wall construction with an inner and outer wall defining a space which is filled with a foam insulating material, the insulating material also providing structural support for the walls of the cover, the inner and outer walls being joined about a peripheral bottom rim of the cover, wherein the peripheral edges of the cover and box are shaped to be in mating relation to one another when the cover is on the box, the cover having an upright rear side defining an opening for a refrigeration unit and having a rearwardly slanted front side defining a hatch for access to the container;
    a hatch lid hinged to the cover about the hatch, the lid being of double wall construction with an inner and outer wall defining a space which is filled with a foam insulating material, the insulating material also providing structural support for the walls of the lid, the inner and outer walls being joined about a peripheral edge of the lid, the periphery of the lid being provided with a flange which engages the front side of the cover about the hatch when the lid is closed;
    means for releasably attaching the cover to the box;
    sealing means about the periphery of the assembled hatch and lid, and about the periphery of the assembled cover and box for restricting the flow of air between the interior and exterior of the container; and
    handle means attached to the cover for assisting the movement of the cover relative to the box.

2. A container as claimed in claim 1, wherein the box, cover and lid are all rotationally molded polyethylene parts having polyurethane foam bonded between the inner and outer walls thereof.

3. A container as claimed in claim 1, further comprising a pair of ground engaging rails formed integrally with the bottom of the box.

4. A container as claimed in claim 3, wherein each rail defines a slot at each end thereof for receiving a forklift prong.

5. A container as claimed in claim 1, wherein the top peripheral rim of the box is provided with an upstanding lip having a sealing gasket and the cover has a bottom peripheral rim and upwardly stepped peripheral surface, the rim and surface of the cover being engageable with the rim and lip of the box to provide a sealed closure of the cover on the box.

6. A container as claimed in claim 1, wherein the means for releasably attaching the cover to the box comprise a plurality of elastomeric members which extend through the bottom rim of the cover and are held thereby, the elastomeric members being releasably engageable with the hold down means on the box.

7. A container as claimed in claim 6, wherein the elastomeric members are rubber slats, three such slats extending through each side rim of the cover and each slat defining a loop which is engageable with a pin formed integrally in the outer wall of the box.

8. A container as claimed in claim 1, wherein the sealing means about the periphery of the hatch is a rubber gasket.

9. A container as claimed in claim 1, further comprising positive hold down means for securing the lid about the hatch.

10. A container as claimed in claim 9, wherein the hold down means is an arm pivotally attached to the cover adjacent the lid.

11. A container as claimed in claim 1, wherein the handle means are forklift loops formed integrally with the top of the cover for receiving prongs of a forklift.

12. A container as claimed in claim 1, further comprising a drain hole defined through a side of the box a the bottom thereof.

* * * * *